RECORDING AND PLAYBACK SYSTEM INCORPORATING
A FIRST CHARACTER POSITIONING SYSTEM
Filed Jan. 15, 1968
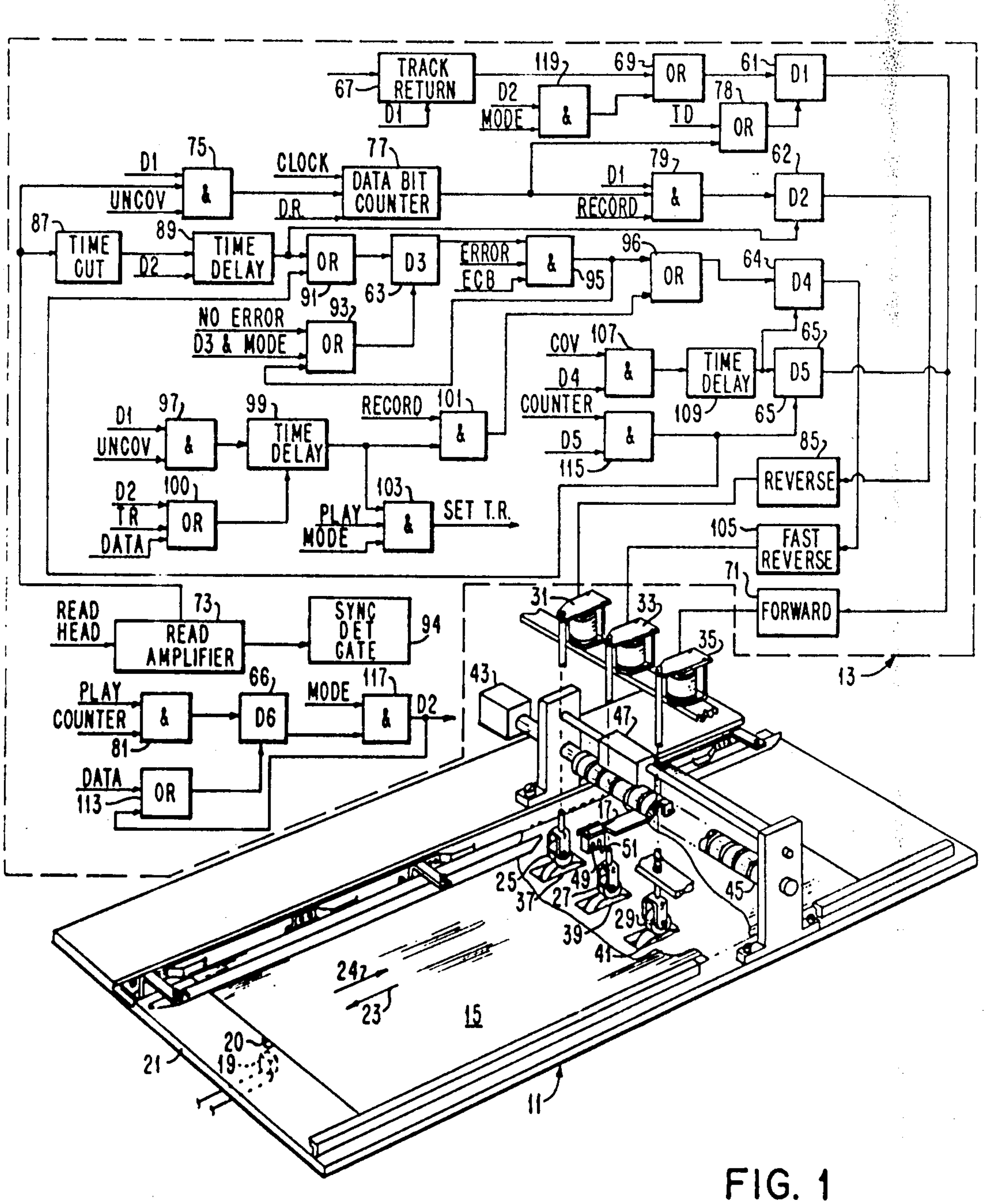
FIG. 1
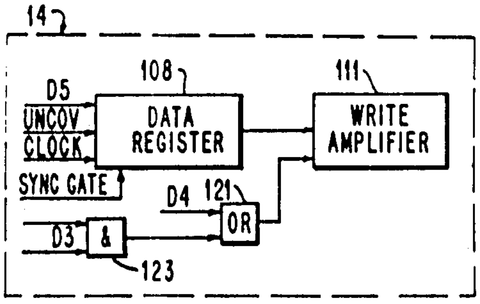
INVENTORS
DONALD J. MORRISON
HOWARD C. TANNER
BY John W Girvin, Jr.
ATTORNEY United States Patent Office 3,523,287
Patented Aug. 4, 1970

3,523,287

RECORDING AND PLAYBACK SYSTEM INCORPORATING A FIRST CHARACTER POSITIONING SYSTEM

Donald J. Morrison and Howard C. Tanner, Lexington, Ky., assignors to International Business Machines Corporation, Armonk, N.Y., a corporation of New York Filed Jan. 15, 1968, Ser. No. 697,716
Int. Cl. G11b 27/20, 15/06
U.S. Cl. 340—174.1 5 Claims

ABSTRACT OF THE DISCLOSURE

A system for providing an accurate positioned reference for the first data character of a group of data characters to be recorded during the relative movement of a recording media with respect to a recording head. A light-sensitive device senses the approximate position of the media and causes a reference character to be recorded on the media during the first increment of relative movement between the media and the recording head only if no such reference character has been previously recorded. The reference character is thereafter utilized by the recording system to control the position of the first data character which in turn controls the position of the following data character. Once the reference character is recorded by the system, it is never altered in subsequent recording operations unless it becomes obliterated or partially obliterated.

CROSS-REFERENCES TO RELATED APPLICATIONS

The following applications are all assigned to the same assignee as the present application.

U.S. patent application Ser. No. 697,735 entitled, "Data Reading, Recording, and Positioning System," Douglas E. Clancy, George W. Hobgood, Jr., and Frederick T. May, inventors, filed 1968 concurrently herewith.

U.S. patent application Ser. No. 697,717 entitled, "Detection and Error Checking System for Binary Data," Cecil Wayne Cox and Frederick T. May, inventors, filed 1968 concurrently herewith.

U.S. patent application Ser. No. 623,053, filed Mar. 14, 1967, entitled, "Data System With Printing, Composing, Communications and Magnetic Card Processing Facilities," Robert A. Kolpek, inventor.

U.S. patent application Ser. No. 623,022, filed Mar. 14, 1967, entitled, "Correlated Recording, Reproducing, Printing, and Composing Apparatus," John E. Jones, Robert A. Kolpek and Robert A. Rahenkamp, inventors.

BRIEF BACKGROUND OF INVENTION

Field

The invention relates to information recording and playback systems wherein data characters are stored on a media in a machine recognizable form and more particularly to a recording and playback system which accurately positions characters recorded relative to a predetermined reference.

Description of the prior art

Prior art data information recording systems utilized to precisely place information on a record media fall into general categories, clocked and self-clocking. An example of a clocked recording system is one wherein timing information is previously recorded on the media and utilized to control the positioning of data characters on the media. Perhaps the most rudimentary system of such a nature is one wherein sprocket holes are prepunched in the media and the position of the sprocket hole is utilized to control the positioning of data characters on the media.

A second prior art approach has been to self-clock the data onto the media. Timing signals are often generated simultaneously with the generation of data signals and recorded simultaneously therewith onto a timing track of the media which will properly time the information for playback purposes. An additional example of a self-clocked data recording system is one wherein each unit or block of data information to be recorded is prefixed by a predetermined prelude pattern. By the utilization of a phase or frequency encoding technique, the binary information bits themselves can be sensed to supply a self-clocking playback. The prelude pattern is sensed to properly synchronize the self-clock and thereafter each data character sensed resynchronizes the clock. The prelude signals are always recorded prior to recording the data signals to insure proper synchronization on playback.

Additionally, some self-clocking systems record a special block marker signal indicating that a block of information follows or precedes the signal. It is to be noted that both the prelude patterns and the block marker patterns are recorded and followed at a fixed time interval thereafter by the recording of information characters. In none of the prior art systems is the block marker signal utilized to control the precise position of the following information. Instead, the block marker signal is utilized to create a time relationship with the recording of the next succeeding information characters. With such prior art systems, the first characters recorded may vary in position with respect to the block marker character. Thus, if it is desirous to change only the first data character of the block of information or any data character within the block of information, the entire block of information associated with the block signal must be rerecorded and rereferenced to the block signal in order to insure that the information following thereafter would be properly clocked.

Mechanical sensing systems and light-sensitive systems also have been utilized in the prior art to control the positioning of data characters on a record media. However, such systems have inherent tolerance variations and therefore are unable to consistently precisely position a data character.

In the aforereferenced concurrently filed application of Douglas E. Clancy, George W. Hobgood, Jr. and Frederick T. May, a unique data positioning system is described wherein each data character is positioned with respect to a preceding data character. In effect, the position of each character in a track of characters thus depends upon the position of the first character. None of the above listed prior art techniques can precisely and consistently locate the first data character of a group of data characters with respect to an unvarying reference.

SUMMARY

In order to overcome the above problems and shortcomings of the prior art and to provide a recording system wherein the position of the first data character is located with respect to an unvarying reference, the recording system of the present invention is provided with a unique referencing scheme which effects the recording of a reference character on the media if no such character has previously been recorded thereon, and which thereafter utilizes the reference character to position data characters. Thus, the first data character is always referenced to a reference character which is never removed from the recording media. Each successive data character is positioned with respect to the preceding data character and, therefore, all data characters effectively are referenced with respect to the reference character. If it is desired to thereafter rerecord the first data character, it may be precisely located on the magnetic media with respect to the reference character in the precise position which the previously recorded first character occupied. Therefore, the reference for the second data character and subsequent data characters remains the same.

Additionally, a previously recorded reference character remains unaltered and is correctly positioned by the system to effect the positioning of the first data character.

An additional feature of the present invention is the utilization of checking circuitry to insure that the reference character is properly recorded and positioned to thereby insure that the first character is recorded with respect to a valid reference.

The foregoing and other features and advantages of the invention will be apparent from the following more particular description of the preferred embodiment of the invention as illustrated in accompanying drawings.

In the drawings:

FIG. 1 is a schematic diagram of the mechanical drive and recording system logic of the present invention.

Referring now to FIG. 1, a schematic diagram of the recording system of the present invention is depicted. It consists of a magnetic card transport and recording device 11 and electronic logic 13 and 14. The magnetic transport and recording device is depicted schematically and is similar to the one described in detail in the aforereferenced patent applications Ser. No. 623,053 and Ser. No. 623,022 incorporated by reference herein. The electronic logic 13 is responsive to signals recorded on the magnetic card media 15 by the recording head 17 and to electrical signals generated by light-sensitive device 19 to provide signals to control the motion of the magnetic card media and to control the recording and/or sensing of a reference character at the beginning of each track of magnetic information to be recorded. Light-sensitive device 19 generates signals in accordance with the position of the magnetic card media 15 with respect to hole 20. The magnetic card transport device comprises a bed plate 21 over which the magnetic card media 15 moves in the direction of arrows 23 and 24. Idler wheels 25, 27, and 29 are selectively actuated by magnet and armature assemblies 31, 33 and 35 respectively to engage the magnetic card media 15 with the continuously rotating drive rollers 37, 39, and 41.

Drive rollers 37 and 39 rotate in a direction which tend to move the magnetic card media 15 in the direction of arrow 23 while drive roller 41 rotates in the direction which tends to move the magnetic card media in the direction of arrow 24. Clutch 43 is operable to effect rotation of lead screw 45 in both directions. Rotation of the lead screw 45 causes corresponding motion of the lead screw follower 47 which in turn positions the magnetic recording head 17 in the desired recording track.

As described above, the electronic logic 13 generates the electrical signals which are utilized to impulse the magnetic and armature assemblies 31, 33, and 35 to thereby effect card motion. Additionally, the electronic logic generates signals which are applied to the recording head 17 at write gap 49 in conjunction with the movement of the magnetic card media 15 to effect recording on the media. Further, as the magnetic card media moves, signals previously recorded on the magnetic card media are sensed at read gap 51 of the recording head 17 and applied to the electronic logic 13.

The following description will relate firstly to an overall description of the functions of the electronic logic 13 and 14 prior to entering into a detailed description of the functions of each of the logic blocks thereof. Generally, the logic functions to assure that a proper reference character precedes all of the data characters in each track of information when both recording information on the magnetic card media 15 and when playing the information back. Once a reference character has been so recorded, the electronic logic functions to insure that the character is not obliterated during subsequent recording operations thereby providing a semipermanent reference for positioning data characters on the magnetic card media 15.

As mentioned above, there are two basic modes of operation: record and playback. When in record mode, the electronic logic 13 functions to insure that a reference character will appear as the first character on each track. There are three potential situations which can thus exist: (1) a reference character has been previously recorded, (2) a reference character has been previously erroneously recorded, (3) no reference character has been previously recorded.

In order to determine which situation exists, when the magnetic card media 15 is returned in the direction of arrow 23 to an initial position as sensed by light-sensitive device 19, and when recording head 17 is aligned to the desired track, the electronic logic 13 effectuates movement of the magnetic card media 15 in the direction of arrow 24 to determine if a reference character has been previously recorded. If the reference character has been previously recorded, it is sensed at read gap 51. Once the entire reference character has thus passed under read gap 51, motion of the magnetic card media 15 in the direction of arrow 24 is halted and the magnetic card media is moved in the direction of arrow 23 so that the reference character assumes a position intermediate of write gap 49 and read gap 51 of the magnetic recording head 17. Thereafter, the previously recorded reference character is utilized to position the first data character to be recorded on the track. Additionally, the reference character is checked at this time to insure that it has been properly recorded. If the reference character had been improperly recorded or if no reference character was found, the magnetic card media 15 is returned in the direction of arrow 23 beyond its initial position as sensed by light sensitive device 19 and thereafter, card motion in the direction of arrow 24 is initiated and the reference character is recorded on the magnetic card media 15 at write gap 49 of the recording head 17. Once the reference character has been so recorded, the media is again positioned so that the reference character may again be checked.

During playback mode, the electronic logic 13 and 14 functions to insure that a reference character is recorded at the start of each track. Absence of the reference character indicates error. This error may thereafter be corrected by the recording of a proper reference character at the start of the track by switching to a record mode. By thus checking for the reference character, the reliability of the system is increased since an attempt is not made to playback potentially erroneous data information until it is insured that the operator is aware that no reference character exists on the track accessed by the recording head 17.

The following more detailed description relates to the functions of each of the logic blocks which comprise the electronic logic 13 and 14. Dummy bit latches 61–66 provide output signals which indicate the sub-cycle status of the electronic logic 13 and which are utilized to effect proper card motion and record sensing and recording. Only one such dummy bit latch is actuated at any particular instant of time during the reference character record or playback cycle.

A reference character record or playback cycle is initiated when a signal is applied to track return latch 67. This signal indicates that either the operator or the machine has generated a signal which has caused the magnetic card media 15 to move in the direction of arrow 23 to an initial position. This signal could be generated, for example, when the magnetic card media 15 is initially inserted into the magnetic card transport and recording device 11 or when the machine operator has completed recording or playing back one track of information and desires to record or playback another track of information. Card motion in the direction of arrow 23 is effected by the engagement of idler wheel 27 with the card media thereby forcing it against the continuously rotating drive roller 39. Drive roller 39 rotates at a higher peripheral velocity than drive rollers 37 and 41 thereby effecting rapid card movement. When the magnetic card media 15 partially covers hole 20 thereby providing a signal to light sensitive device 19, card motion in the reverse direction is halted. Once the card motion ceases and after it is insured that the recording head 17 has accessed the desired track, a signal is supplied by track return logic (not shown) to set the track return latch 67. OR circuit 69 gates the output of the track return latch to set the $D_1$ dummy bit latch 61. The track return latch 67 is then immediately reset with the output signal of the $D_1$ dummy bit latch. The output signal of the $D_1$ dummy bit latch 61 energizes forward control circuit 71 which in turn provides a signal to the magnet and armature assembly 35 to effectuate movement of the magnetic card media in the forward direction of arrow 24.

As the magnetic card media 15 moves in the forward direction, hole 20 becomes uncovered. Assuming that a reference character has been previously recorded, the reference character will pass under read gap 51 of recording head 17 thereby providing signals to read amplifier 73. Read amplifier 73 amplifies and shapes the signals to provide a series of output binary signals. These output signals are gated with the output signal of the $D_1$ dummy bit latch 61 and with the output signal of the light sensitive device 19 indicating that the hole 20 is uncovered by AND circuit 75 to thereby provide a train of input data signals to the data bit counter 77. Data bit counter 77 counts the binary bits and provides an output signal indicating that all of the bits of the reference character have been received. In the event that certain of the bits are not detected, a clock signal is also supplied to the data bit counter which supplies the missing signals. The output signal of the data bit counter 77 is applied to OR circuit 78 which provides an output to reset the $D_1$ dummy bit latch 61 thereby removing the signal from the forward control circuit 71 thus stopping forward motion of the magnetic card media. In record mode, the output signal of the data bit counter 77 is gated by AND circuit 79 to set the $D_2$ dummy bit latch 62 and when in playback mode, it is gated by AND circuit 81 to set the $D_6$ dummy bit latch 66.

The following description will assume that record mode has been selected and that the $D_2$ dummy bit latch 62 has thus been set. Since it is desirous to utilize the reference character to control the placement of the first data character, it is necessary that the reference character which has passed under read gap 51 of the recording head 17 be placed in a position where it may once again be sensed at the read gap 51 to thereby control the placement of the first data character in the manner described in the aforereferenced patent application of Douglas E. Clancy, George W. Hobgood, Jr., and Frederick T. May, filed concurrently herewith.

Therefore, the setting of the $D_2$ dummy bit latch provides a signal to the reverse control circuit 85 which in turn energizes the magnet and armature assembly 31. Energization of the magnet and armature assembly 31 causes idler wheel 25 to engage the magnetic card media 15 with continuously rotating drive roll 37 thereby effectuating motion of the magnetic card media 15 in the direction of arrow 23. As the magnetic card media moves in the direction of arrow 23, the binary bits of the reference character pass in the reverse direction under the read gap 51 of the recording head 17. These signals are sensed and shaped by read amplifier 73 and applied to timeout circuit 87.

Each data bit of the reference character applied to timeout circuit 87 resets the timeout circuit. After the last such data bit is received, timeout circuit 87 times out and supplies a signal which is gated with the output signal of the $D_2$ dummy bit latch 62 to time delay circuit 89. The time delay circuit delays the signal for a sufficient time to insure that the sync bit of the reference character is sufficiently removed from read gap 51 to allow for media acceleration on a subsequent record cycle but is of sufficiently short time duration to insure that none of the reference character passes under write gap 49. The output signal of time delay circuit 89 resets the $D_2$ dummy bit latch thereby removing the signal to reverse control circuit 85 which in turn effects the removal of idler wheel 25 from the magnetic card media 15 thereby causing the card media to come to a stop. Additionally, the output signal of time delay circuit 89 is applied through OR circuit 91 to set the $D_3$ dummy bit latch 63. At this time, the reference character is located on the magnetic card media 15 at a position between write gap 49 and read gap 51 of the recording head 17 and the device is ready to receive its first data character.

As described in the aforereferenced application of Douglas E. Clancy, George W. Hobgood, Jr. and Frederick T. May, filed concurrently herewith, when a record cycle is initiated, the magnetic card media 15 moves firstly in a forward direction as an error check is performed on the previously recorded character. Thereafter, the media is incremented in the reverse direction to once again align the previously recorded character between the write gap 49 and the read gap 51. On the following cycle, the media is again incremented in the forward direction and the sensing of the sync bit of the previously recorded character at read gap 51 by sync bit detector gate 94 effectuates the recording of the character to be recorded at the write gap 49. Thus, the character to be recorded is referenced to the sync bit position of the previously recorded character.

In the present instance, the reference character is the previously recorded character and if the error detection circuit indicates that it is correctly recorded during the first forward increment of the record cycle, a no- error indication is applied to OR circuit 93 which resets the $D_3$ dummy bit latch 63. Thereafter, the remaining subcycles of the record operation are effectuated and the device operates in accordance with the above referenced application of Douglas E. Clancy, George W. Hobgood, Jr. and Frederick T. May.

If, however, the error detection circuitry indicates that the reference character is in error, the machine stops with an error indication. The machine operator may thereafter depress an error correct backspace key to initiate the rerecording of the reference character. An electrical signal generated in response to the depression of the error correct backspace key, the output signal of the $D_3$ dummy bit latch 63, and a signal indicating the error are gated by AND circuit 95 to provide an output signal which resets the $D_3$ dummy bit latch 63 through OR circuit 93 and sets the $D_4$ dummy bit latch 64 through OR circuit 96.

Setting of the $D_4$ dummy bit latch 64 initiates a sequence which will effect the recording of the reference character on the magnetic card media 15. This sequence may be initiated as described above when the reference character has previously been erroneously recorded or it may be initiated as will be described, when no reference character has previously been recorded on the accessed data track.

In the description above, it was assumed that the read amplifier 73 sensed the presence of a reference character during the first forward pass of the magnetic card media 15 in the direction of arrow 24 under the control of the $D_1$ dummy bit latch 61. During this forward movement of the magnetic card media when in record mode, AND circuit 97 provides an output signal to time delay circuit 99. This signal is delayed by time delay circuit 99 for a time duration which corresponds to the worse case sensing of the reference character. That is, the time delay corresponds to the maximum interval acceptable for the sensing of the reference character. If the reference character is sensed during this time delay, the $D_2$ dummy bit latch 62 is set as described above and provides an output signal to OR circuit 100 which resets the time delay circuit 99 thereby precluding it from generating an output signal. If, however, no reference character is sensed, time delay circuit 99 provides an output signal which is applied to OR circuit 78 to reset the $D_1$ dummy bit latch 61 and which is also applied to AND circuit 101 and to AND circuit 103. If in record mode, AND circuit 101 gates the output of the time delay circuit 99 to set the $D_4$ dummy bit latch 64 through OR circuit 96. Thus, we have seen that the $D_4$ dummy bit latch 64 is set when in record mode and when no reference character is sensed or when the reference character previously recorded has been recorded incorrectly.

When the $D_4$ dummy bit latch 64 is set, it provides an output signal to fast reverse control circuit 105 which in turn provides a signal to the magnet and armature assembly 33. The magnet and armature assembly 33 then effectuates downward movement of idler wheel 27 onto the magnetic card media forcing it against the continuously rotating high speed drive roller 39 thereby effecting rapid motion of the card in the direction of arrow 23. When the magnetic card media 15 covers hole 20, light sensitive device 19 provides a signal to AND circuit 107 which is gated with the output signal of the $D_4$ dummy bit latch 64. The output signal of AND circuit 107 resets the $D_4$ dummy bit latch 64 thereby removing the input signal to the fast reverse control circuit 105 which in turn effectuates the removal of idler roller 27 from the magnetic card media 15. The output signal from AND circuit 107 is also utilized to gate the reference character into data bit register 108 for utilization during a subsequent recording cycle. Thus, at this point in time, the magnetic card media 15 becomes stationary at an initial position. During the next subsequent cycle of operation, the card is moved in the forward direction and the reference character is recorded on the card.

The output signal of AND circuit 107 is delayed through time delay circuit 109 and then utilized to set the $D_5$ dummy bit latch 65 which in turn initiates a reference character recording subcycle. The output signal of $D_5$ dummy bit latch energizes forward motion of the magnetic card media 15 in the direction of arrow 24. As the magnetic card media 15 moves in the direction of arrow 24, hole 20 becomes uncovered causing light sensitive device 19 to supply a signal which is gated with the output signal of the $D_5$ dummy bit latch and the clock to gate the reference character from the data register 108 to the write amplifier 111. This signal is then applied to the write coil (not shown) of the recording head 17, thereby effectuating character recording at write gap 49. The output signals from the data register 108 are also applied to data bit counter 77 which in turn provides an output signal when the complete reference character has been recorded. This output signal, along with the output signal from the $D_5$ dummy bit latch is applied to AND circuit 115 which provides a signal which resets the $D_5$ dummy bit latch 65 which in turn removes the signal from forward control circuit 71 thereby effectuating the cessation of motion of the magnetic card media 15. Additionally, the output signal from AND circuit 115 is applied to OR circuit 91 to thereby set the $D_3$ dummy bit latch 63.

At this point in time, the just recorded reference character is aligned on the magnetic card media 15 between write gap 49 and read gap 51 of recording head 17. Thereafter, a data record cycle may be initiated and, as described above, if the reference character was correctly recorded, subsequent data record cycles may be thereafter initiated. However, if the error detection circuitry detects that the just recorded reference character was in error, the $D_4$ dummy bit latch 64 becomes set when the error correct backspace key is depressed thereby reinitiating another attempt at recording the reference character.

The above description relates primarily to the operation of the electronic logic 13 when in record mode. When a track return is initiated in play mode, the $D_1$ dummy bit latch is set as when in record mode. Setting of the $D_1$ dummy bit latch 61 initiates card motion in the forward direction of arrow 24 and the sensing of a reference character during the forward motion steps data bit counter 77 which provides an output signal to AND circuit 81 when the complete reference character has been read. At this time, the $D_1$ dummy bit latch 61 is reset and the $D_6$ dummy bit latch 66 is set. Playback of the next subsequent data character causes the $D_6$ dummy bit latch 66 to be reset when the data character signal is applied to OR circuit 113.

Instead of playing out the data characters, the machine operator may decide to change from the playback mode to record mode after a track return operation. Since the reference character has been moved past read gap 51, and since it must be sensed by read gap 51 when recording data characters, it is necessary to move the magnetic card media 15 in direction of arrow 23 so that the operator may at this time effect the recording of a data character.

Therefore, when the operator changes mode from playback mode to record mode after the reference character has passed the read gap but before the playback of the first data character as indicated by the $D_6$ dummy bit latch 66, AND circuit 117 gates the output signal of the $D_6$ dummy bit latch 66 with a mode change signal and provides an output signal which sets the $D_2$ dummy bit latch 62 and resets the $D_6$ dummy bit latch 66. Setting of the $D_2$ dummy bit latch 62 effectuates card motion in the reverse direction of arrow 23. The card motion is halted as described above when the reference character is between write gap 49 and read gap 51. Additionally, as described above, at the completion of the motion in the direction of arrow 23, the $D_2$ dummy bit latch 62 is reset and the $D_3$ dummy bit latch 63 is set. Thereafter, the data character recording cycle described above may be effectuated.

Electronic logic 13 also compensates for the inverse of the above situation, that is, when the operator desires to change from record mode to play mode prior to recording the first character. In this instance, the $D_3$ dummy bit latch 63 will be on indicating that the machine is awaiting entry of the first data character. If the operator changes modes at this time, AND circuit 119 provides an output signal to OR circuit 69, thereby turning on the $D_1$ dummy bit latch 61. Additionally, the output signal from AND circuit 119 is applied to OR circuit 93 to reset the $D_3$ dummy bit latch 63. Setting of the $D_1$ dummy bit latch 61 effectuates forward movement of the magnetic card media in the direction of arrow 24. When the data bit counter 77 indicates that the complete reference character has passed the read gap 51, the $D_1$ dummy bit latch 61 is reset and the $D_6$ dummy bit latch 66 is set as described above. Thereafter, a data playback cycle may be initiated.

An additional situation exists in the playback mode when the reference character is not sensed. In this situation, time delay circuit 99 provides an output signal. Additionally, an indicator lamp (not shown) is lit signifying that the reference character was not sensed. The operator may thereafter attempt to play out data characters which may or may not be recorded on the track. However, the operator may also desire to change modes in order to record a proper reference character on the data track. In this situation, AND circuit 103 is gated to provide an output signal when the operator changes modes. This output signal is applied to set the track return logic of the machine. The track return logic of the machine will effectuate the high speed reverse movement of the magnetic card media 15 in the direction of arrow 23 and then set the track return latch 67. Thereafter, the reference character is recorded as described above.

Whenever a track return is initiated in record mode, current to the magnetic recording head is turned off to insure that recorded data signals are not obliterated. It is necessary to insure that this current is turned on at the proper time once the media is returned to its initial position to thereby preclude the possible obliteration of a previously recorded reference character and to insure that the noise spike resulting from the turn on of current is not sensed as a character bit. As described above, when it has been determined that no reference character exists on the track or when a reference character existing is in error, turning on the $D_4$ dummy bit latch 64 effectuates the high speed movement of the magnetic card media 15 in the reverse direction of arrow 23. Additionally, the output of the $D_4$ dummy bit latch 64 is applied to OR circuit 121 which gates on the write amplifier 111. Thereafter, the write amplifier 111 remains on until turned off by a track return operation or by detection of an error. This insures that the entire area which could receive the reference character is erased. The noise spike created by the turning on of the current is subsequently raised during a subsequent data record cycle as described in the aforereferenced application of Douglas E. Clancy, George W. Hobgood, Jr., and Frederick T. May, filed concurrently herewith.

If, however, the reference character had been correctly recorded, the $D_3$ dummy bit latch 63 would be on awaiting the initiation of the first data record cycle. In this instance, write current is gated on by AND circuit 123 upon the initiation of the data record cycle. The corresponding noise spike would either be erased during the record cycle or would be located in close proximity to the end of the first data character thus recorded. In this location, the noise spike will not be confused with data.

OPERATION

The following description relates to the operation of the preferred embodiment of the invention during the reference character cycle. Three modes of operation will be described: record, playback, and mode change. When in record mode, data information is to be recorded serially along tracks of the magnetic card media 15. When in play mode, data information previously recorded is sensed. A mode change is initiated when changing from one mode of operation to another.

In record mode, when the magnetic card media 15 is inserted into the magnetic card transport and recording device 11 or when the machine or operator signifies that all the data to be recorded on a particular track of information has been recorded, the track return logic (not shown) of the device effects high speed motion of the magnetic card media 15 in the direction of arrow 23. Simultaneously, clutch 43 is energized to effect rotation of lead screw 45 to effect placement of recording head 17 to the desired track. When the magnetic card media 15 covers hole 20, light sensitive device 19 provides an output signal which removes the high speed drive from the magnetic card media 15. When it is insured that the recording head is properly placed in the correct track and that the motion of the magnetic card media 15 in the direction of arrow 23 ceased, track return latch 67 is set.

Setting of the track return latch 67 initiates a reference character cycle by causing the $D_1$ dummy bit latch 61 to be set. Setting of the $D_1$ dummy bit latch initiates a subcycle wherein the magnetic card media 15 is moved in the forward direction of arrow 24 past the read gap 51 of recording head 17 to determine if a reference character has been previously recorded.

The forward motion is effected by the setting of forward control circuit 71 by the output signal of the $D_1$ dummy bit latch. Forward control circuit 71 energizes the magnet and armature assembly 35 which causes idler wheel 29 to engage the magnetic card media 15 forcing it against continuously rotating drive roll 41.

Any character information previously recorded on the magnetic card media 15 is sensed at read gap 51 and applied to read amplifier 73. Data bit counter 77 provides an output signal once a complete character has thus passed under read gap 51. This signal is applied to reset the $D_1$ dummy bit latch 61 and to set the $D_2$ dummy bit latch 62. If, however, no data character is sensed within a predetermined time as determined by time delay circuit 99, the $D_4$ dummy bit latch 64 is set and the $D_1$ dummy bit latch 61 is reset. Resetting of the $D_1$ dummy bit latch removes the forward drive from the magnetic card media 15.

If a reference character were previously recorded, setting of the $D_2$ dummy bit latch 62 effects card motion in the reverse direction of arrow 23 through reverse control 85. Time-out circuit 87 and time delay circuit 89 insure that the entire previously recorded data character passes under read gap 51 but does not pass under write gap 49 as the magnetic card media moves in the direction of arrow 23. Once the previously recorded character is thus positioned between write gap 49 and read gap 51, the $D_2$ dummy bit latch 62 is reset and the $D_3$ dummy bit latch 63 is set.

Setting of the $D_3$ dummy bit latch indicates to the machine logic that a data record cycle may thereafter be effectuated. During a data record cycle as described in the aforereferenced application of Douglas E. Clancy, George W. Hobwood, Jr. and Frederick T. May, filed concurrently herewith, the magnetic card media 15 is incremented in the forward direction of arrow 24 and the previously recorded character passes under read gap 51. This character is checked for error in a manner described in the aforereferenced application of Cecil Wayne Cox and Frederick T. May, filed concurrently herewith. If the previously recorded character was recorded and sensed correctly, the magnetic card media 15 is incremented in the direction of arrow 23 so that the previously recorded character once again resides between write gap 49 and read gap 51. Thereafter, the magnetic card media is incremented in the direction of arrow 24 and the sensing of the cync bit of the previously recorded character at read gap 51 initiates the recording of the data character located in data register 108 at write gap 49. Thus, the position of the character to be recorded is dependent upon the position of the previously recorded character.

When the reference character is the previously recorded character, the data record cycle is as described above. If no error is sensed, the $D_3$ dummy bit latch 63 is reset. At this point in time, all of the dummy bit latches 61–66 are reset and recording continues in the manner described in the aforereferenced application of Douglas E. Clancy, George W. Hobgood, Jr., and Frederick T. May. If, however, the reference character was erroneously recorded or sensed, the card motion in the forward direction of arrow 24 is halted and an error indication is given to the machine operator. If the machine operator thereafter depresses an error correct backspace key, the $D_3$ dummy bit latch is reset and the $D_4$ dummy bit latch 64 is set.

Setting of the $D_4$ dummy bit latch 64 upon either sensing that the reference character was recorded in error or that no reference character was recorded initiates a sequence of machine subcycles which effect the proper recording of a reference character. When the $D_4$ dummy bit latch 64 is set, fast reverse circuit 105 is energized thereby effectuating rapid movement of the magnetic card media 15 in the direction of arrow 23. Simultaneously, erase current is applied to the write amplifier 111 thereby assuring that a previously recorded erroneous reference character is eradicated from the media. When the magnetic card media 15 covers hole 20, light sensitive device 19 supplies a signal which is gated with the output signal of the $D_4$ dummy bit latch to reset the $D_4$ dummy bit latch and, after a time delay as determined by time delay circuit 109, the $D_5$ dummy bit latch 65 is set.

Setting of the $D_5$ dummy bit latch effectuates card motion in the forward direction of arrow 24 through forward control circuit 71. Upon receiving a signal from light sensitive device 19 that hole 20 is uncovered, a reference character stored in data register 108 is gated to the write amplifier circuit 111, thereby effectuating recording of the reference character at write gap 49 onto the magnetic card media 15 which is moving in the direction of arrow 24. Once a complete character has thus been recorded as sensed by data bit counter 77, AND circuit 115 is gated which effectuates the resetting of the $D_5$ dummy bit latch 65 and the setting of the $D_3$ dummy bit latch 63. Resetting of the $D_5$ dummy bit latch 65 causes card motion in the forward direction to cease. At this point in time, the just recorded reference character lies intermediate of write gap 49 and read gap 51 and the $D_3$ dummy bit latch 63 is on indicating that a data character may thereafter be recorded.

Summarizing the record operation, once the magnetic card media 15 has been track returned to its initial position, it is moved in the forward direction of arrow 24 past recording head 17 under the control of the $D_1$ dummy bit batch 61. If a reference character has been previously recorded, the magnetic card media is incremented in the reverse direction of arrow 23 under the control of the $D_2$ dummy bit latch until the reference character lies intermediate of write gap 49 and read gap 51. Thereafter, the $D_3$ dummy bit latch 63 is set which indicates that the device is in a status adapted to receive a data character. Upon entry of the data character, the magnetic card media 15 is incremented in the forward direction of arrow 24 and the previously recorded reference character is checked to determine that it was correctly recorded. If correctly recorded, subsequent data character record cycles are effected. If the reference character was incorrectly recorded, the magnetic card media is moved in the direction of arrow 23 under the control of the $D_4$ dummy bit latch 64. Additionally, if no character was sensed during the initial forward motion of the magnetic card media 15 under the control of the $D_1$ dummy bit latch 61, the $D_4$ dummy bit latch is energized thereby effectuating movement of the magnetic card media in the reverse direction of arrow 23. Thus, if no character was previously recorded or if a previously recorded character were in error, magnetic card media 15 is returned to its initial position. Thereafter, the magnetic card media 15 is moved in the direction of arrow 24 under the control of the $D_5$ dummy bit latch 65 and a reference character is recorded. Card motion then ceases and the $D_3$ dummy bit latch 63 is set indicating that a data record cycle may be thereafter initiated.

The description which immediately follows will relate to the operation of the device when in play mode. The track return logic of the machine supplies a signal to the track return latch 67 which in turn initiates a reference character cycle by setting the $D_1$ dummy bit latch 61 in the manner discussed above with respect to record mode. Thereafter, the magnetic card media 15 moves in a forward direction and if a reference character has been recorded, data bit counter 77 supplies output signal to AND circuit 81 which sets the $D_6$ dummy bit latch 66 and resets the $D_1$ dummy bit latch 61. At this point in time, the reference character has passed under read gap 51 and if a data character had been previously recorded thereafter, it would be located intermediate of write gap 49 and read gap 51. Subsequent playout of the data character effectuates the resetting of the $D_6$ dummy bit latch 66 and data playout thereafter proceeds.

In the instance where no reference character was sensed during the initial forward movement in the direction of arrow 24 under the control of the $D_1$ dummy bit latch 61, time delay circuit 99 provides an output signal which resets the $D_1$ dummy bit latch and indicates to the operator that the reference character was not sensed. Thereafter, the operator may attempt to read out data characters or the operator may initiate a cycle which will correctly record a reference character. This cycle will be described in the following section relating to mode change.

The following description relates to the operation of the device when the operator desires to change modes from record mode to play mode or from play mode to record mode while in a reference character cycle. As mentioned above, if in play mode and no reference character is sensed, the operator may thereafter desire to record a reference character. By changing modes at this time, AND circuit 103 is gated and the track return logic of the machine initiates card motion in the direction of arrow 23 back to the initial position. Thereafter, the $D_1$ dummy bit latch 61 is set, and since the mode has been changed to record mode, the operation will thereafter proceed as in record mode described above wherein no reference character was previously recorded on the track.

Additionally, the operator may desire to change modes from play to record prior to the playout of the first data character but after the sensing of a reference character. In this situation, the $D_6$ dummy bit latch 66 is set indicating that a data playout cycle may thereafter be effected. When the operator changes mode, AND circuit 117 is gated which resets the $D_6$ dummy bit latch 66 and sets the $D_2$ dummy bit latch 62. Setting of the $D_2$ dummy bit latch effectuates card motion in the reverse direction so that the reference character becomes aligned between write gap 49 and read gap 51. Thereafter, the $D_3$ dummy bit latch 63 is set indicating that a data record cycle may thereafter be effected. The data record cycle is as described above with respect to record mode.

One final situation exists when the operator is in record mode and prior to recording the first character, desires to change to play mode. In this instance, the $D_3$ dummy bit latch 63 will be on indicating that a data record cycle may thereafter be effected. When the mode is changed, AND circuit 119 is gated thereby setting the $D_1$ dummy bit latch 61 and resetting the $D_3$ dummy bit latch 63. Setting of the $D_1$ dummy bit latch causes the magnetic card media 15 to move in the forward direction of arrow 24, thus moving the reference character from a position intermediate of write gap 49 and read gap 51 to a position wherein the reference character has passed read gap 51. At this time, the $D_1$ dummy bit latch is reset as described above with respect to the play mode operation and the $D_6$ dummy bit latch is set indicating that a data playout cycle may thereafter be initiated.

In the above description, there has been described an incremental recording device. It is, of course, recognized by those skilled in the art that the recording system of the present invention could be utilized in a high speed recording mode. That is, as the magnetic card media 15 moves in the forward direction the sensing of the reference character could initiate the next subsequent data record or play cycle. Thereafter, subsequent data record cycles would be effected until the track end was reached. If no reference character were discovered during the first portion of the forward movement, a reference character recording cycle could be initiated. Error checking could be performed during high speed return motion of the card track past the recording head.

The above description has related to a magnetic recording system wherein the media moves relative to the recording head. This system is equally applicable where the recording head moves relative to the media and to recording systems other tahn magnetic media, for example, optical systems utilizing light sensitive recording media.

While the invention has been particularly shown and described with reference to a preferred embodiment thereof, it should be understood by those skilled in the art, that the foregoing and other changes in form and detail may be made therein without departing from the scope of the invention.

What is claimed is:

1. In a recording and playback system for serially recording and sensing a plurality of data characters on a record media, a data character referencing system comprising:

a recording station;

a reading station spaced a fixed distance from the recording station;

position sensing means for providing an output signal representative of a singular approximate relative position of said media and said reading and recording station;

first control means responsive to the output signal of said position sensing means for effective relative motion between said media and said reading and recording stations in a first direction for a predetermined time interval;

detection means for detecting previously recorded information signals on said media during said predetermined time interval and for providing an output signal whenever said sensed information signals do not conform to a predetermined pattern;

positioning means responsive to the output signal of said detection means for effecting relative motion between said media and said reading and recording stations in a second direction opposite said first direction for a time interval;

second control means operative after said time interval for effecting relative motion between said media and said reading and recording stations in said first direction;

recording means responsive to said position sensing means and to said second control means for recording a predetermined pattern of information signals onto said media at said recording station;

sensing means at said reading station for providing an output signal upon sensing an information signal within the predetermined pattern of information signals during relative motion between said media and said reading and recording stations in said first direction;

gating means responsive to the output signal of the sensing means for gating data characters to said recording means for recording information signals representative of said data characters onto said media at said recording station at a position on said media that is a function of the position of the predetermined pattern of information signals on said media and said fixed distance between the reading and recording station.

2. The data character referencing system set forth in claim 1 wherein said detection means detects previously recorded information signals on said media at said reading station.

3. The data character referencing system set forth in claim 2 having third control means responsive to said detection means for effecting relative motion between said media and said reading and recording stations in said second direction upon sensing the absence of said output signal of said detection means.

4. The data character referencing system set forth in claim 3 having error detection means responsive to signals sensed at said reading station for providing an output error signal if the pattern sensed does not conform to the predetermined pattern.

5. The data character referencing system set forth in claim 4 wherein said positioning means is responsive to the output error signal for effecting said relative motion in said second direction.

References Cited

UNITED STATES PATENTS 3,296,605 6/1967 Raddin et al. ...... 235—61.114

BERNARD KONICK, Primary Examiner

V. P. CANNEY, Assistant Examiner

U.S. Cl. X.R.

235—61.11